United States Patent [19]
Thuillier et al.

[11] 3,864,477
[45] Feb. 4, 1975

[54] NEW COMPOSITIONS

[75] Inventors: Yvonne Thuillier, Paris; Marcel Antoine Perrault, Saint Cloud, both of France

[73] Assignee: Albert Rolland S.A., Paris, France

[22] Filed: Apr. 12, 1973

[21] Appl. No.: 350,530

Related U.S. Application Data

[63] Continuation-in-part of Ser. No. 110,271, Jan. 27, 1971, abandoned, which is a continuation of Ser. No. 709,897, March 4, 1968, abandoned.

[52] U.S. Cl. .................................................. 424/94
[51] Int. Cl. ........................................... A61k 19/00
[58] Field of Search ....................................... 424/94

[56] References Cited
UNITED STATES PATENTS
2,795,529  6/1957  Alburn et al. ........................ 424/94
3,367,836  2/1968  Thuillier .............................. 424/94

FOREIGN PATENTS OR APPLICATIONS
1,076,776  7/1967  Great Britain ....................... 424/94

OTHER PUBLICATIONS

Physician's Desk Reference, (PDR), 19th Edition, pp. 530.

*Primary Examiner*—Stanley J. Friedman
*Assistant Examiner*—Norman A. Drezin
*Attorney, Agent, or Firm*—Brumbaugh, Graves, Donohue & Raymond

[57] ABSTRACT

The invention provides pharmaceutical and cosmetic compositions for application to skin showing elastic tissue changes comprising an enzymatic material having elastolytic activity and a vehicle.

3 Claims, No Drawings

NEW COMPOSITIONS

This application is a continuation-in-part of application Ser. No. 110,271, filed Jan. 27, 1971, now abandoned, which was a continuation of application Ser. No. 709,897, filed Mar. 4, 1968, now abandoned.

The present invention relates to compositions having elastolytic activity useful for external application to the human skin in therapeutics and cosmetics.

The invention provides pharmaceutical or cosmetic compositions for external use comprising 0.01 to 1% by weight of the composition of an enzymatic material having elastolytic activity as hereinafter described, in association with a vehicle of neutral or slightly alkaline pH suitable for external application. These new compositions are suitable for treating changes of the skin, streaks (or stria distensae), and senile elastorexia.

The enzymatic material used is that described and claimed in our U.S. Pat. No. 3,367,836 and British Patent Specification No. 1,076,776, the contents of which are incorporated herein by specific reference, both applications covering similar subject matter.

This enzymatic compound possesses an elastolytic activity on a specific substrate, namely elastin, extracted from fibres of collagen. The said enzymatic compound has its isoelectric point at 9.5 ± 0.5. It is sparingly soluble in water, at pH below 4.5. It possesses an ultraviolet absorption spectrum having peaks at 2,200 and 2,800 A. By electrophoretic analysis, the compound has two constituents, one of which has a slower mobility than the gamma globulins and digests elastin, while the other has the mobility of $\beta$-1, $\beta$-2 globulins.

This material may be prepared by the process described in our aforesaid Patent Specifications which consists in extracting a delipidated pancreas powder, obtained by conventional extraction of the pancreas with acetone and ether, with an M/100 sodium acetate buffer having a pH value between 4.8 and 5. The extract thus obtained is precipitated with ammonium sulphate solution of concentration between 48 and 55% and filtered. The precipitate is suspended and demineralized by dialysis. Under these conditions, an impure product is obtained in this first stage which is insoluble in water and nonhomogeneous to electrophoresis. It is purified by fractional precipitation in the presence of an alcohol, such as methanol or preferably ethanol. In the first precipitation, in which a 50% alcohol is employed, a precipitate of proteins containing no compound having elastolytic activity is obtained, and these are eliminated by filtration. A second precipitation is then effected with 80% alcohol, and a precipitate is then obtained containing the purified compound used in this invention. This product is cold-centrifuged and redissolved in an M/100 sodium acetate buffer at a pH between 4.7 and 5 and lyophilised. The operations may with advantage be carried out in the presence of calcium ions which have a stabilising effect on the desired enzymatic compound. The various stages of the process take place at low temperature, below 5°C. and preferably about −2°C.

It has now been found that this elastolytic compound may advantageously be externally applied for the treatment of collagenosis and changes of the skin and tissues, notably in old people.

The normal human skin comprises at the level of the derma a network of fairly fine elastic fibres in balanced proportion with the collagen fibres. These ensure adequate suppleness of the skin. In the course of aging, a change occurs in the tissues, and a certain degree of physiopathological change of this elastic network. The skin acquires an irregular, pebbled appearance, sometimes with alternations of flaccid zones and indurated zones.

The elastin and its mucoproteic complex, containing a mucopolysaccharide, appear to become more polymerised, giving rise to compartments depleted of water and the formation of aggregates rich in elastin. The hydrophobic bonds perform an important function in the stability and resistance of the elastic fibres.

In order to retard this normal evolution of the human skin with the advance of age, and notably to combat the undesirable appearance of wrinkles, more especially in women, we have studied the enzymatic mechanisms which may act on the polymerisation of the elastic fibres and stimulate tissue biosynthesis. Owing to their nature, the elastic fibres can only be modified by strong acids or strong bases which are not encountered in vivo. Consequently attention has been given to agents of natural origin which have a catalytic action on elastin. Trypsin and chymotrypsin are only capable of attacking some peptidic bonds situated at the end of the chain of the tropocollagen molecule. Only compounds having an elastolytic activity have proved active on fibrous proteins such as collagen and especially elastin. Likewise, the problem of atrophoderma is similar to the physiopathological evolution referred to above. In such cases, it is found that the elastic tissue changes both at the level of the elastic fibres of the skin and at the cutaneous walls of the arterioles, which results in disproportionate distribution of the subcutaneous water.

In accordance with the present invention, however, we have found that this elastolytic compound may be employed to treat the aforesaid changes, in the form of ointments, creams, pomades, masks and beauty milks suitable for application to the skin of the body and of the face.

The new compositions are made by mixing by methods known per se the aforesaid compound having elastolytic activity in a proportion advantageously between 0.01 and 1% by weight of the final composition, with a stabilising agent, such as calcium chloride, and an excipient commonly used in cosmetology, preferably a polyethylene glycol.

The pH of the cosmetic composition should be taken from a value of 9.8 (isoelectric point of the enzymatic product) to near neutrality (pH 6.8 to 8); to this end a few drops of mineral acid, preferably HCl N/10, are added to the composition until the desired pH is obtained.

Citric acid and EDTA which inhibit the activity of the enzyme cannot be used to decrease the pH.

The role of calcium chloride in these compositions is explained by the fact that elastase occurs in two forms: one, a monomer in which the active site is free; the other, a dimer in which two moles are cross-linked by a calcium atom. The dimer form is the most stable; hence it is necessary to add calcium chloride in order to stabilise the elastase under its dimer form.

The cosmetic composition according to the invention preferably comprises 10 mg of the enzymatic material prepared by the process hereinabove described, 250 mg of calcium chloride, 100 mg of polyethylene glycols.

Polyethylene glycols preferably used are selected from the group consisting of those polyethylene glycols having mean molecular weight of 400 and 4,000, in equal quantities.

By way of Example, the following is a formula for a composition according to the invention appropriate for external application.

EXAMPLE

An ointment of the following formula is prepared:

| | |
|---|---|
| Elastolytic compound | 10 mg. |
| Calcium chloride | 250 mg. |
| Polyethylene glycols of mean molecular weights 400 and 4,000 respectively, commercially known under the names: "CARBOWAX 400" and "CARBOWAX 4000", in equal quantities | 100 mg. |
| Perfume | 0.02 mg. |

The pH of the mixture is brought to neutrality or slight alkalinity (6.8 to 8) with a few drops of HCl N/10.

This mixture of polyethyleneglycols having molecular weights of 400 and 4,000 allow a good penetration of the composition in the derma; in addition, they make it possible to ensure a good conservation of the enzyme in the composition, as shown by the following examples:

Two compositions were prepared with an enzymatic material which contained 2500 elastolytic units in 500 mg of product.

Composition 1 : (according to the invention)
— enzymatic product    10 mg    (50 elastolytic units)
— polyethyleneglycols   MW 400
                        MW 4000   100 mg.
— CaCl₂                           250 mg.
— perfume                         0.02 mg.
— a few drops of HCl N/10 until a pH 6.8 to 8.

Composition 2 : (prepared for comparison)
— enzymatic product    10 mg (50 elastolytic units)
— polyethyleneglycols
    of M.W 1500                   100 mg.
— CaCl₂                           250 mg.
— perfume                         0.02 mg.
— a few drops of HCl N/10 until a pH 6.8 to 8.

The elastolytic activity was determined in the two compositions a few hours after their preparation:

Composition 1 according to the invention contained 49.7 elastolytic units, and composition 2 contained 18 elastolytic units.

Thus, the mixture of polyethyleneglycols of molecular weights 400 and 4,000 enable a conservation of 97% of the enzymatic activity, while the polyethyleneglycol of molecular weight 1,500 only enable 37% of this activity to be conserved.

The composition according to the invention, when employed for local application, did not give rise to any allergic or irritating reaction.

They are used for treatment, by local application, of the skin whose elastic fibres have been damaged. In particular, they are useful for delaying the appearance of wrinkles in elderly persons, and for treating streaks (or striae distensae). They have also enabled a very considerable improvement to be obtained in the state of the skin in two cases of pseudoxanthoma elasticum which presented masses of elastic fibres which are swollen and degenerated in the medium and lower layers of the derma.

We claim:

1. A method for treating stria distensae, and *pseudoxanthoma elasticum* which comprises applying topically to a human host in need of such treatment a cosmetic composition, in a therapeutically effective amount, comprising an elastolytically active enzymatic material prepared from delipidated pancreatic material, said enzymatic material having an isoelectric point of about $9.5 \pm 0.5$, a slight solubility in water having a pH below 4.5, peaks in the ultraviolet spectrum at 2,200 and 2,800 A and having two main constituents, the first constituent of said enzymatic material electrophoretically demonstrates a mobility slower than gamma globulins and digests elastin and the second constituent electrophoretically demonstrates a mobility comparable to $\beta 1$ and $\beta 2$ globulins, said enzymatic material being produced in accordance with the following steps:

1. conventional extraction of the pancreas with acetone and ether to obtain a delipidated pancreas powder;
   2. extraction of said powder with an M/100 sodium acetate buffer at a pH between 4.8 and 5;
   3. precipitation of active material by addition to extract of ammonium sulfate in a concentration of between about 48 to 55%;
   4. demineralization of said precipitate of active material by dialysis;
   5. fractional precipitation with ethanol or methanol comprising the steps of:
      a. a first precipitation in about 50% ethanol or methanol to remove inactive material, and
      b. a second precipitation in about 80% ethanol or methanol of active material;
   6. solution of active material in an M/100 sodium acetate buffer at a pH between 4.7 and 5; and
   7. lyophilization, said steps being carried out at a temperature less than about 5°C;

and wherein the amount of said enzymatic material present in said cosmetic composition is from about 0.01 to about 1% by weight, further comprising calcium chloride in amount sufficient to stabilize said cosmetic composition and polyethyleneglycols having mean molecular weights of 400 and 4000, in equal quantities, the pH of the composition being adjusted between 6.8 and 8.0 with HCl as a neutralizing agent.

2. A method according to claim 1 wherein the cosmetic composition comprises 10 parts by weight of said enzymatic material, 250 parts by weight of calcium chloride, 100 parts by weight of polyethylene glycols selected from the group consisting of those polyethylene glycols having mean molecular weights of 400 and 4,000 in equal quantities and 0.02 parts by weight of perfume, said composition having a pH of about 6.8 to about 8.0.

3. A method according to claim 1, wherein the disease being treated is stria distensae.

* * * * *

UNITED STATES PATENT OFFICE
CERTIFICATE OF CORRECTION

PATENT NO. : 3,864,477
DATED : February 4, 1975
INVENTOR(S) : Thuillier, Yvonne; and Perrault, Marcel Antoine It is certified that error appears in the above-identified patent and that said Letters Patent are hereby corrected as shown below:

First page, after item "[21]", insert:

[30] Foreign Application Priority Data

March 7, 1967    France...................1,523,250
March 7, 1967    France...................CAM 250

Column 2, line 22, after "Consequently", insert a comma.

Column 4, lines 7 and 8, "pseudoxanthoma elasticum" should not be italicized.

Signed and sealed this 10th day of June 1975.

(SEAL)
Attest:

RUTH C. MASON
Attesting Officer

C. MARSHALL DANN
Commissioner of Patents
and Trademarks